(12) United States Patent  
Yokoyama

(10) Patent No.: US 11,550,431 B2
(45) Date of Patent: Jan. 10, 2023

(54) DISPLAY METHOD AND DISPLAY DEVICE

(71) Applicant: SEIKO EPSON CORPORATION, Tokyo (JP)

(72) Inventor: Issei Yokoyama, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/501,296

(22) Filed: Oct. 14, 2021

(65) Prior Publication Data

US 2022/0121317 A1 Apr. 21, 2022

(30) Foreign Application Priority Data

Oct. 15, 2020 (JP) .............................. JP2020-174003

(51) Int. Cl.
*G06F 3/042* (2006.01)
*G06F 3/04883* (2022.01)

(52) U.S. Cl.
CPC .......... *G06F 3/0425* (2013.01); *G06F 3/0428* (2013.01); *G06F 3/04883* (2013.01)

(58) Field of Classification Search
CPC .. G06F 3/0425; G06F 3/0428; G06F 3/04883; G06F 3/017; G06F 3/0304; G06F 3/0482; G06F 3/04845; G06F 1/1645
See application file for complete search history.

(56) References Cited

U.S. PATENT DOCUMENTS

| | | | | | |
|---|---|---|---|---|---|
| 5,467,102 | A | * | 11/1995 | Kuno | G06F 1/1643 345/1.3 |
| 5,485,176 | A | * | 1/1996 | Ohara | G09B 5/062 345/173 |
| 5,854,997 | A | * | 12/1998 | Sukeda | G06F 40/45 704/7 |
| 6,034,685 | A | * | 3/2000 | Kuriyama | G06F 3/04883 345/169 |
| 6,072,476 | A | * | 6/2000 | Harada | G06F 3/14 345/204 |
| 6,545,669 | B1 | * | 4/2003 | Kinawi | G06F 3/1438 345/173 |
| 7,634,136 | B2 | * | 12/2009 | Kawamoto | G06F 3/04883 382/187 |

(Continued)

FOREIGN PATENT DOCUMENTS

| | | |
|---|---|---|
| JP | 2003-271294 A | 9/2003 |
| JP | 2017-45298 A | 3/2017 |
| JP | 2020-61179 A | 4/2020 |

*Primary Examiner* — Benyam Ketema
(74) *Attorney, Agent, or Firm* — Oliff PLC

(57) ABSTRACT

A display method includes accepting a first handwritten input to a display surface, determining a first area including a position on the display surface where the first handwritten input is made, displaying a first image corresponding to the first handwritten input in the first area, displaying a second image formed by enlarging the first image with a predetermined enlargement ratio, in a second area on the display surface, accepting a second handwritten input in the second area, and displaying an image corresponding to the second handwritten input as a part of the first image, at a position in the first area corresponding to a position in the second area where the second handwritten input is made, and in a size reduced with a reduction ratio that is a reciprocal of the predetermined enlargement ratio.

8 Claims, 9 Drawing Sheets

(56) References Cited

U.S. PATENT DOCUMENTS

| | | | |
|---|---|---|---|
| 7,750,893 B2* | 7/2010 | Hashimoto | G06F 3/0488 345/157 |
| 8,194,043 B2* | 6/2012 | Cheon | G06F 1/1616 345/1.3 |
| 8,581,864 B2* | 11/2013 | Miyazawa | G06F 3/04883 345/173 |
| 8,712,478 B2* | 4/2014 | Inami | H04M 1/0241 455/90.3 |
| 9,261,964 B2* | 2/2016 | Townsend | G06F 3/03545 |
| 9,454,304 B2* | 9/2016 | Hinckley | G06F 3/0483 |
| 9,696,899 B2* | 7/2017 | Kim | G06F 1/1616 |
| 9,715,252 B2* | 7/2017 | Reeves | G06F 1/1616 |
| 9,851,747 B2* | 12/2017 | Winsky | G06F 1/1616 |
| 9,958,958 B2* | 5/2018 | Naess | H04N 9/3194 |
| 10,114,542 B2* | 10/2018 | Cho | G06F 3/04883 |
| 10,503,396 B2* | 12/2019 | Rubalcava | G06F 3/04883 |
| 10,514,844 B2* | 12/2019 | Seibert | G06F 3/0383 |
| 11,157,047 B2* | 10/2021 | Seibert | G06F 1/1677 |
| 2004/0070573 A1* | 4/2004 | Graham | G06F 3/04883 345/179 |
| 2006/0227106 A1* | 10/2006 | Hashimoto | G06F 3/0482 345/157 |
| 2007/0075915 A1* | 4/2007 | Cheon | H04M 1/72427 345/1.1 |
| 2008/0046425 A1* | 2/2008 | Perski | G06F 3/04883 |
| 2010/0251112 A1* | 9/2010 | Hinckley | G06F 3/04845 715/702 |
| 2011/0018821 A1* | 1/2011 | Kii | G06F 1/1641 345/173 |
| 2011/0102354 A1* | 5/2011 | Fuyuno | G06F 1/1643 345/173 |
| 2012/0318077 A1* | 12/2012 | Paca | G09B 11/00 73/865.4 |
| 2014/0101575 A1* | 4/2014 | Kwak | G06F 3/0486 715/761 |
| 2014/0101578 A1* | 4/2014 | Kwak | G06F 3/017 715/761 |
| 2014/0111416 A1* | 4/2014 | Sugiura | G06V 30/36 345/156 |
| 2015/0067504 A1* | 3/2015 | Kim | G06F 3/0482 715/708 |
| 2015/0098653 A1* | 4/2015 | Akashi | G06F 3/04883 382/189 |
| 2015/0193141 A1* | 7/2015 | Goldsmith | G06F 3/04883 345/173 |
| 2016/0147437 A1* | 5/2016 | Tsutsui | G06V 30/1423 715/268 |
| 2016/0286191 A1* | 9/2016 | Henninen | H04N 9/3194 |
| 2017/0060324 A1 | 3/2017 | Shimotono et al. | |
| 2018/0095653 A1* | 4/2018 | Hasek | G06F 3/04883 |
| 2019/0243598 A1* | 8/2019 | Kim | G06T 1/20 |
| 2020/0241695 A1* | 7/2020 | Ikeda | G06F 3/042 |
| 2020/0241697 A1* | 7/2020 | Ikeda | G06F 3/0304 |
| 2020/0310589 A1* | 10/2020 | Otani | G06F 3/0421 |
| 2020/0310590 A1* | 10/2020 | Otani | G06F 3/0421 |
| 2021/0271342 A1* | 9/2021 | Tomizawa | G06F 3/0425 |

* cited by examiner

FIG. 1
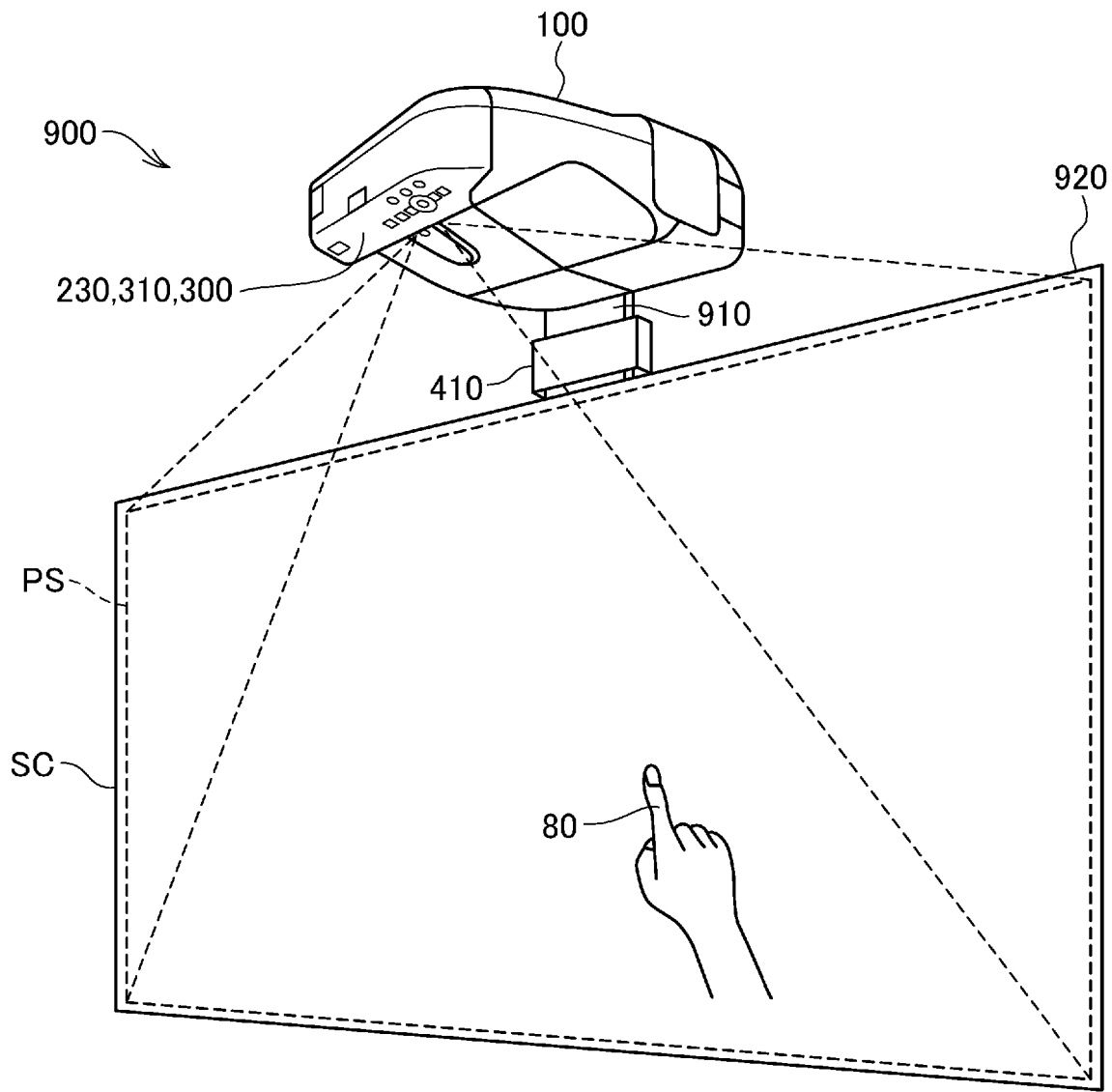
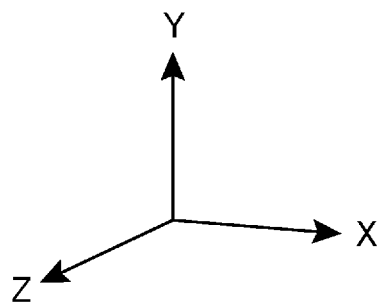

FIG. 7
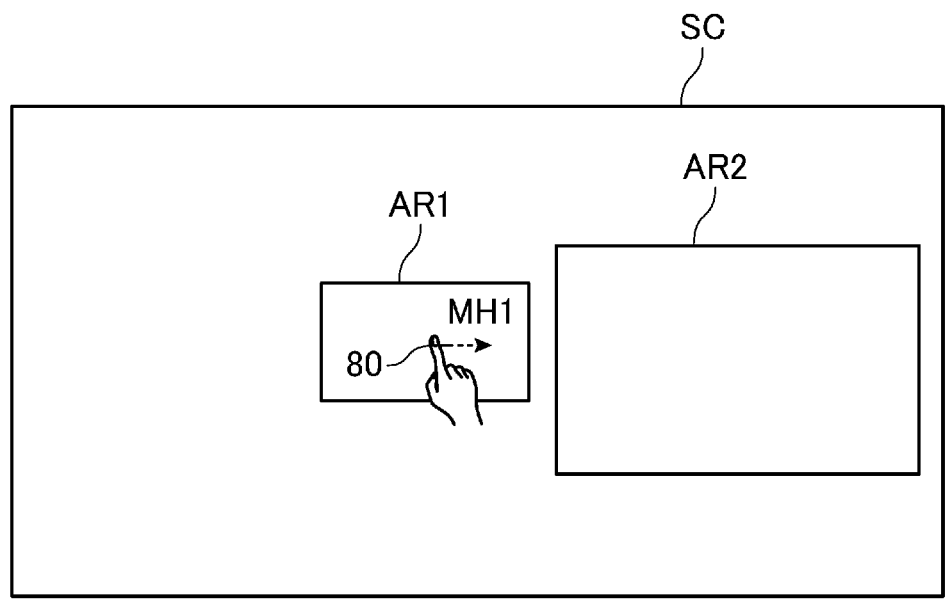
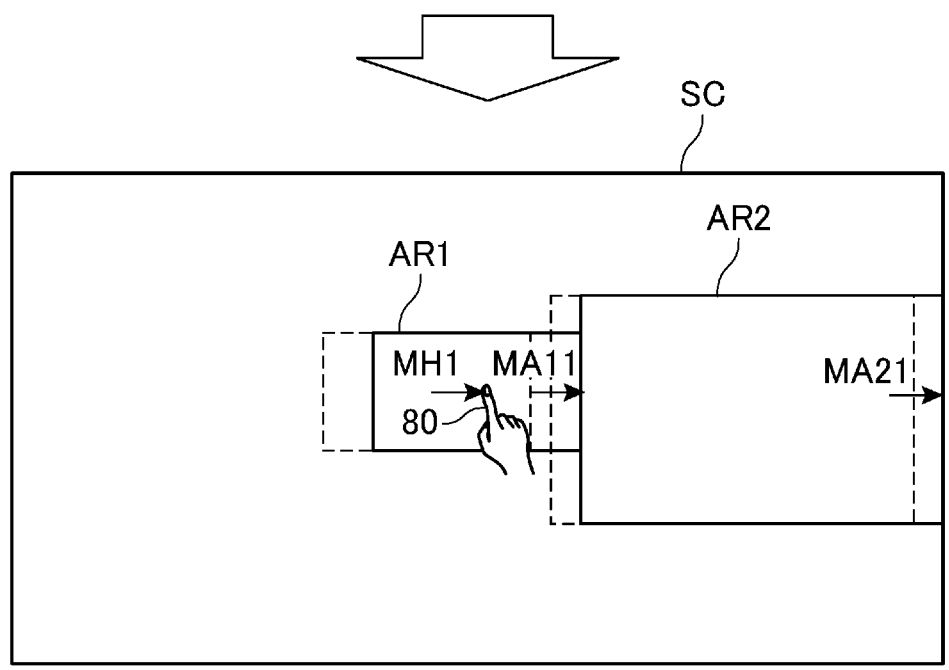

FIG. 8
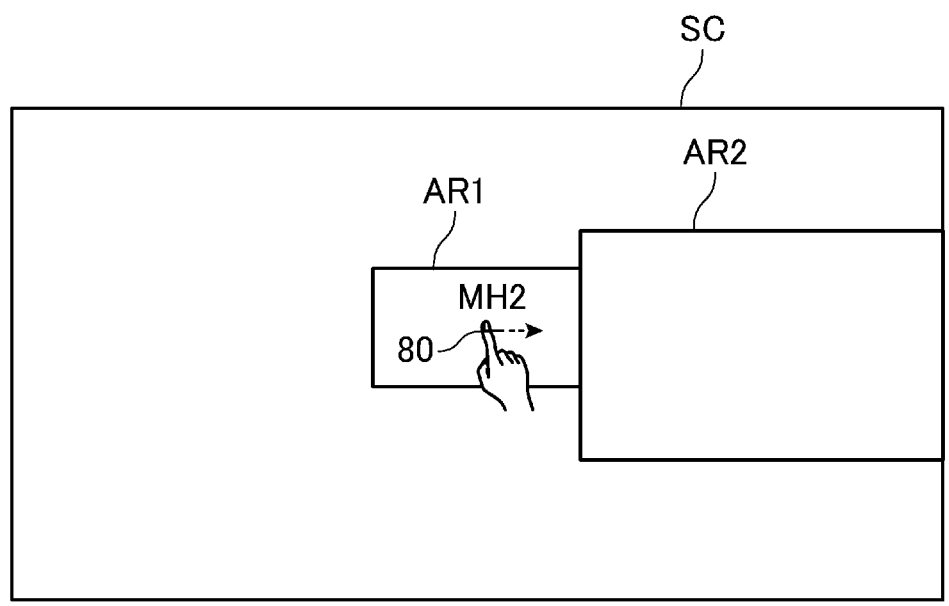
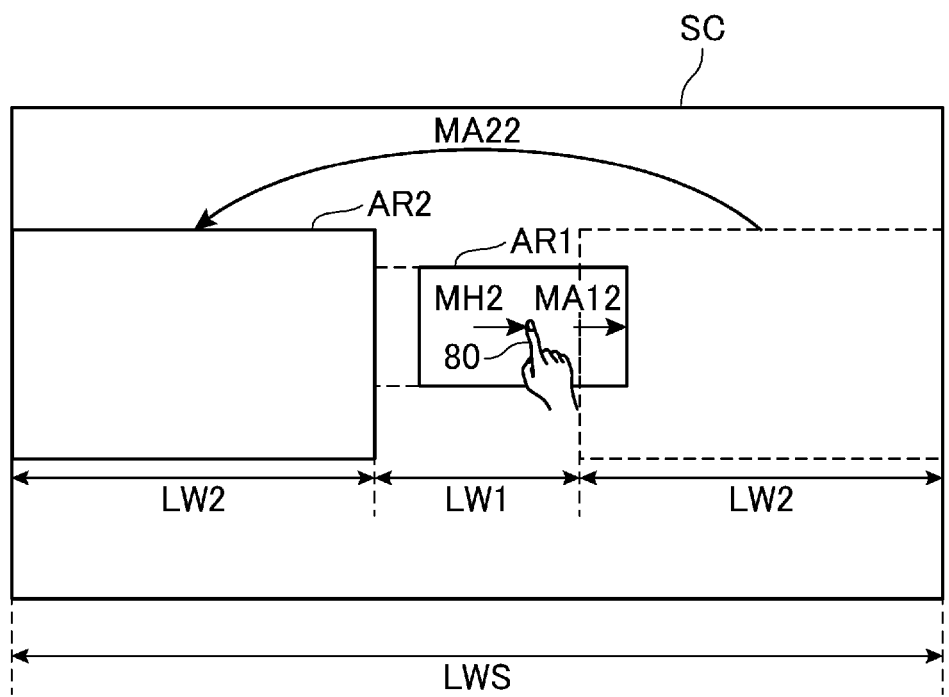

DISPLAY METHOD AND DISPLAY DEVICE

The present application is based on, and claims priority from JP Application Serial Number 2020-174003, filed Oct. 15, 2020, the disclosure of which is hereby incorporated by reference herein in its entirety.

BACKGROUND

1. Technical Field

The present disclosure relates to a display method and a display device.

2. Related Art

Various techniques for accepting a handwritten input in an information processing device or the like are disclosed.

For example, in an information processing device described in JP-A-2020-61179, when a plurality of slide operations in different directions are detected during the execution of a drawn input mode, a copy of a drawing designated by one slide operation of the plurality of slide operations is generated without executing a drawing processing. Also, the displayed copy is enlarged according to the amount of movement of a second slide operation.

However, the information processing device described in JP-A-2020-61179 needs slide operations to copy and enlarge the drawn image and therefore has room for improvement in operability.

SUMMARY

A display method according to an aspect of the present disclosure includes accepting a first handwritten input to a display surface, determining a first area including a position on the display surface where the first handwritten input is made, displaying a first image corresponding to the first handwritten input in the first area, displaying a second image formed by enlarging the first image with a predetermined enlargement ratio, in a second area on the display surface, accepting a second handwritten input in the second area, and displaying an image corresponding to the second handwritten input as a part of the first image, at a position in the first area corresponding to a position in the second area where the second handwritten input is made, and in a size reduced with a reduction ratio that is a reciprocal of the predetermined enlargement ratio.

A display device according to another aspect of the present disclosure includes a display displaying an image on a display surface, a detector detecting a position of a handwritten input to the display surface, and a controller controlling the image displayed on the display surface, based on a result of detection by the detector. The controller executes accepting a first handwritten input to the display surface, based on a result of detection by the detector, determining a first area including a position on the display surface where the first handwritten input is made, displaying a first image corresponding to the first handwritten input in the first area, displaying a second image formed by enlarging the first image with a predetermined enlargement ratio, in a second area on the display surface, accepting a second handwritten input in the second area, according to a result of detection by the detector, and displaying an image corresponding to the second handwritten input as a part of the first image, at a position in the first area corresponding to a position in the second area where the second handwritten input is made, and in a size reduced with a reduction ratio that is a reciprocal of the predetermined enlargement ratio.

BRIEF DESCRIPTION OF THE DRAWINGS

FIG. 1 is a perspective view showing an example of a display system according to an embodiment.

FIG. 7 shows a third specific example of processing by the controller.

FIG. 8 shows a fourth specific example processing by the controller.

DESCRIPTION OF EXEMPLARY EMBODIMENTS

An embodiment will now be described with reference to the drawings.

Figure 2:
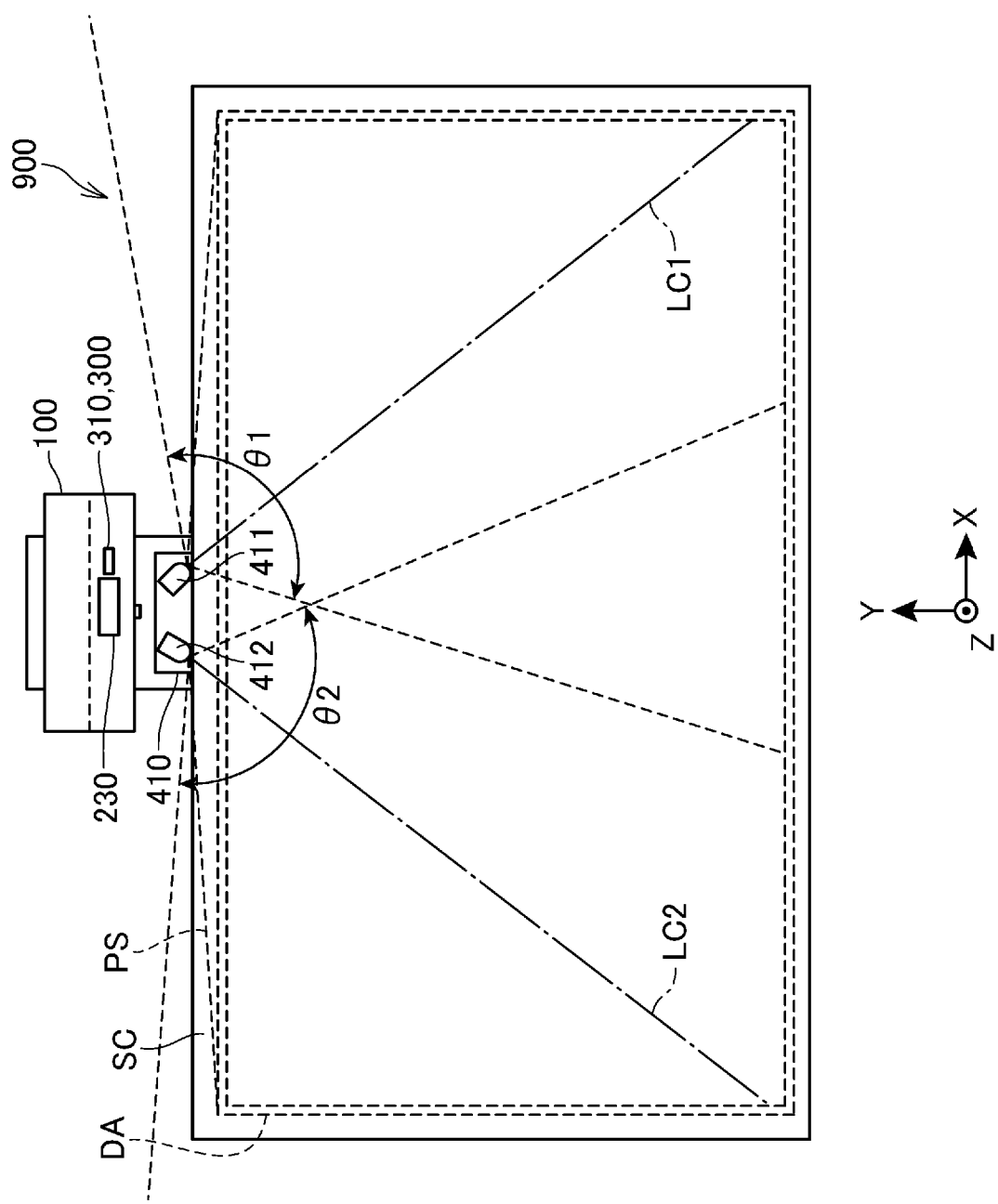
FIG. 2 is a front view showing an example of the configuration of the display system.
Figure 3:
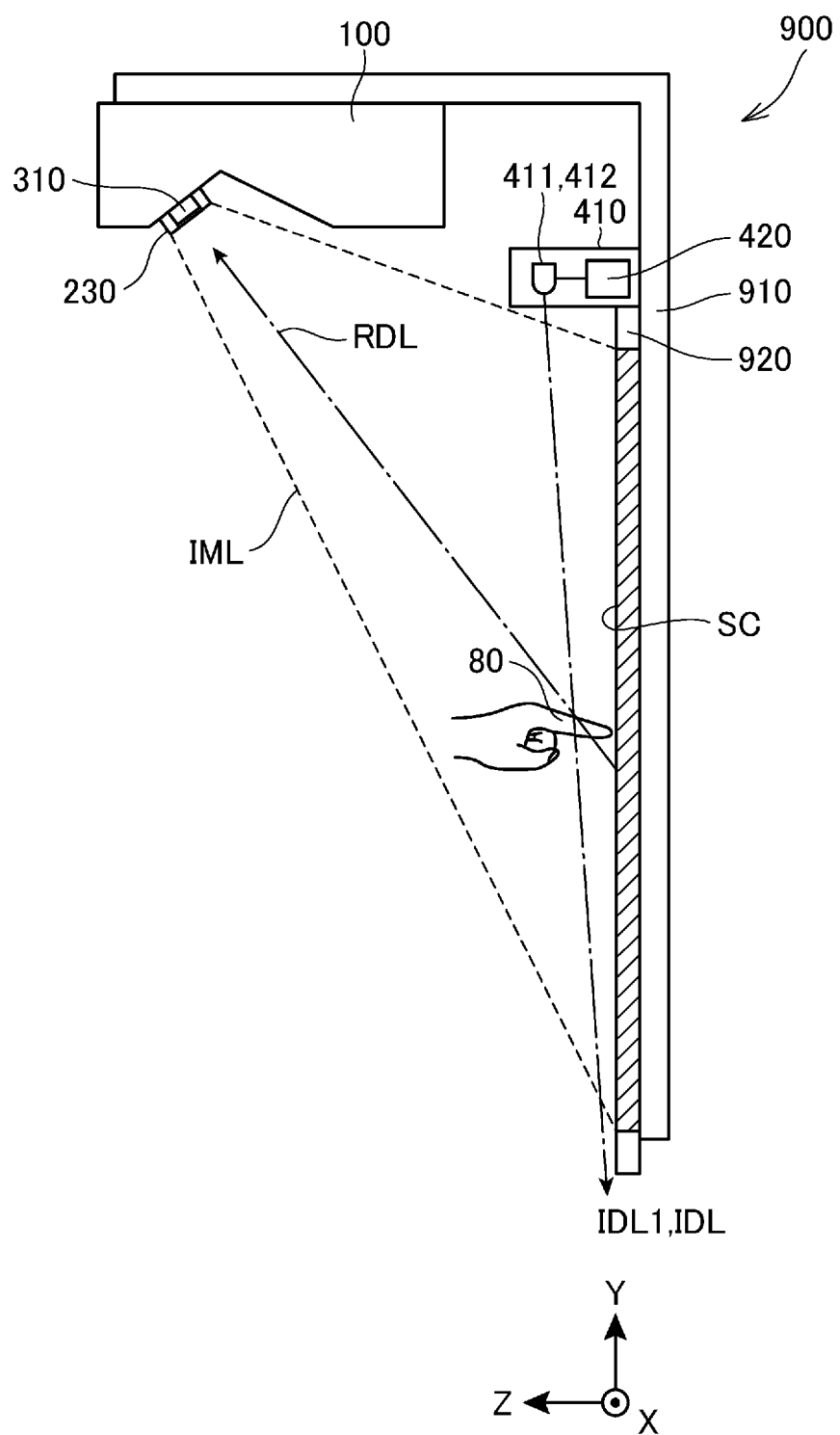
FIG. 3 is a side view showing an example of the configuration of the display system.

First, referring to FIGS. 1 to 3, the configuration of a display system 900 according to this embodiment is described. FIG. 1 is a perspective view showing an example of the display system 900 according to this embodiment. FIG. 2 is a front view showing an example of the configuration of the display system 900. FIG. 3 is a side view showing an example of the configuration of the display system 900.

In FIG. 1, an X-axis, a Y-axis, and a Z-axis orthogonal to each other are shown. The Y-axis is parallel to the vertical direction. Each of the X-axis and the Z-axis is parallel to the horizontal direction. In FIGS. 1 to 3, a screen SC is parallel to the Y-axis. When standing at the screen SC, the X-axis represents a left-right direction and the Z-axis represents a front-rear direction. A positive direction along the X-axis represents a right direction. A positive direction along the Y-axis represents an upward direction. A positive direction along the Z-axis represents a front direction.

As shown in FIG. 1, the display system 900 has a projector 100, and a screen board 920 is arranged at a position corresponding to the projector 100. A front surface of the screen board 920 is used as the screen SC. The screen SC in this embodiment is a rectangle having long sides parallel to the X-axis and short sides parallel to the Y-axis. The projector 100 is fixed to the front of and above the screen board 920 by a support member 910.

Although the screen SC is arranged along the vertical direction in FIG. 1, the screen SC may be arranged along the horizontal direction. Also, while a case where the projector 100 projects an image onto the flat screen SC is described in this embodiment, the projection target is not limited to the screen SC and may be a flat surface such as a wall surface of a building or may be a curved surface or an uneven surface.

The projector 100 projects image light onto the screen SC and thus forms a projection image PS on the screen SC. The projection image PS represents an image projected on the screen SC by the projector 100. In the normal use of the projector 100, the projection image PS is projected in such a way as to fit within the screen SC.

The screen SC is an example of a "display surface".

The projection image PS is, for example, an image projected based on image data generated by the projector 100. In this embodiment, the projector 100 generates the image data based on a handwritten input by a pointer 80.

In this embodiment, the projection image PS includes, for example, a handwritten text image TX and a frame image PL. The text image TX and the frame image PL will be described later with reference to FIGS. 5 and 6.

In the display system 900, a position indication operation by the pointer 80 can be performed on the screen SC, and the projector 100 detects an indicated position indicated by the pointer 80. The pointer 80 is a pen, a user's hand finger or the like.

In this embodiment, a case where the pointer 80 is a user's hand finger is described.

The projector 100 has a projection system 230, an image pickup device 300 including a camera 310, and a detection light emitter 410. The projection system 230 projects the projection image PS onto the screen SC. The camera 310 picks up an image of the projection image PS and outputs a picked-up image PM. The angle of view of the camera 310, that is, the image pickup range, is a range including at least the projection image PS on the screen SC. A projection lens of the projection system 230 and an image pickup lens of the camera 310 are arranged at a bottom surface of the projector 100.

As shown in FIG. 3, the detection light emitter 410 emits detection light IDL for detecting an indicated position indicated by the pointer 80. The detection light emitter 410 is fixed to the support member 910 or the screen board 920 and arranged at an upper part of the screen SC.

The detection light emitter 410 emits the detection light IDL for detecting a tip of the pointer 80, in a direction of covering the screen SC. Specifically, the detection light emitter 410 emits the detection light IDL in a planar manner along the screen SC. As the detection light IDL emitted by the detection light emitter 410, for example, near-infrared light is used.

The detection light emitter 410 has a first emitter 411, a second emitter 412, and an adjustment mechanism 420 adjusting the direction of emission of each of the first emitter 411 and the second emitter 412.

As shown in FIG. 2, the first emitter 411 emits the detection light IDL along the right half of the screen SC and the second emitter 412 emits the detection light IDL along the left half of the screen SC. Each of the first emitter 411 and the second emitter 412 has, for example, a light source such as an LED (light-emitting diode), and an optical element that diffuses detection light emitted from the light source along the screen SC and thus emits the diffused light as the detection light IDL.

The first emitter 411 emits the planar detection light IDL with an optical axis LC1 in a range of angle θ1. The second emitter 412 emits the planar detection light IDL with an optical axis LC2 in a range of angle θ2. Each of the angle θ1 and the angle θ2 is greater than 90 degrees. In FIG. 2, for the sake of convenience, the first emitter 411 and the second emitter 412 are illustrated as spaced apart from each other. However, the first emitter 411 and the second emitter 412 are arranged closely to each other.

Thus, the detection light emitter 410 emits light in a range approximately 180 degrees downward from the upper part of the screen SC. This light forms a layer of light along the screen SC.

The optical axis LC1 of the detection light IDL is adjusted in such a way that the surface of the screen SC and the layer of light do not come into contact but are close to each other, as shown in FIG. 3. In order for the projector 100 to accurately detect the indicated position indicated by the pointer 80, the distance between the surface of the screen SC, which is an operation surface, and the layer of light of the detection light IDL, is preferably as short as possible. On the other hand, as the distance between the surface of the screen SC and the layer of light of the detection light IDL becomes shorter, a detection error occurs due to unevenness or an obstacle on the surface of the screen SC. The distance between the surface of the screen SC and the layer of light is adjusted, for example, to a range of 1 to 10 mm.

The area to which the detection light emitter 410 emits the detection light IDL is an area corresponding to the projection image PS on the screen SC and is preferably an area including the projection image PS.

When in a normal mode where the projector 100 detects an operation by the pointer 80, the projector 100 after having the detection light IDL adjusted detects reflected detection light RDL, which is reflected light of the detection light IDL emitted from the detection light emitter 410 and reflected by the pointer 80, as a bright spot from the picked-up image PM picked up by the camera 310. In this case, the projector 100 can detect an operation by the pointer 80 in an area to which the detection light IDL is emitted and which is included in the angle of view of the camera 310. In other words, an area included in the angle of view of the camera 310, of the area to which the detection light emitter 410 emits the detection light IDL, is an area where an operation by the pointer 80 can be detected. A detection area DA shown in FIG. 2 is an area where an operation by the pointer 80 can be detected.

The detection area DA includes the projection image PS on the screen SC.

The camera 310 has at least a first image pickup function of receiving light in a wavelength range including the wavelength of the detection light IDL emitted from the detection light emitter 410 and thus picking up an image. Preferably, the camera 310 also has a second image pickup function of receiving light including visible light and thus picking up an image, and is configured to be able to switch between these two image pickup functions.

For example, preferably, the camera 310 has a near-infrared filter switching mechanism, not illustrated, that can place a near-infrared filter blocking visible light and transmitting only near-infrared light, in front of the lens, and withdraw the near-infrared filter from the front of the lens.

The projector 100 detects an indication operation by the pointer 80, specifies an indicated position, and performs an operation corresponding to the indicated position. For example, in response to an operation by the pointer 80, the projector 100 operates in a whiteboard mode where the projector 100 draws a character, a geometric shape, a line drawing or the like, and projects the drawing as the projection image PS.

In this embodiment, a case where the projector 100 operates in the whiteboard mode is described.

The projector 100 can also operate in other modes than the whiteboard mode. For example, the projector 100 can execute an operation mode where the projector 100 projects the projection image PS, based on image data inputted from an image source, not illustrated, such as a personal computer.

Figure 4:
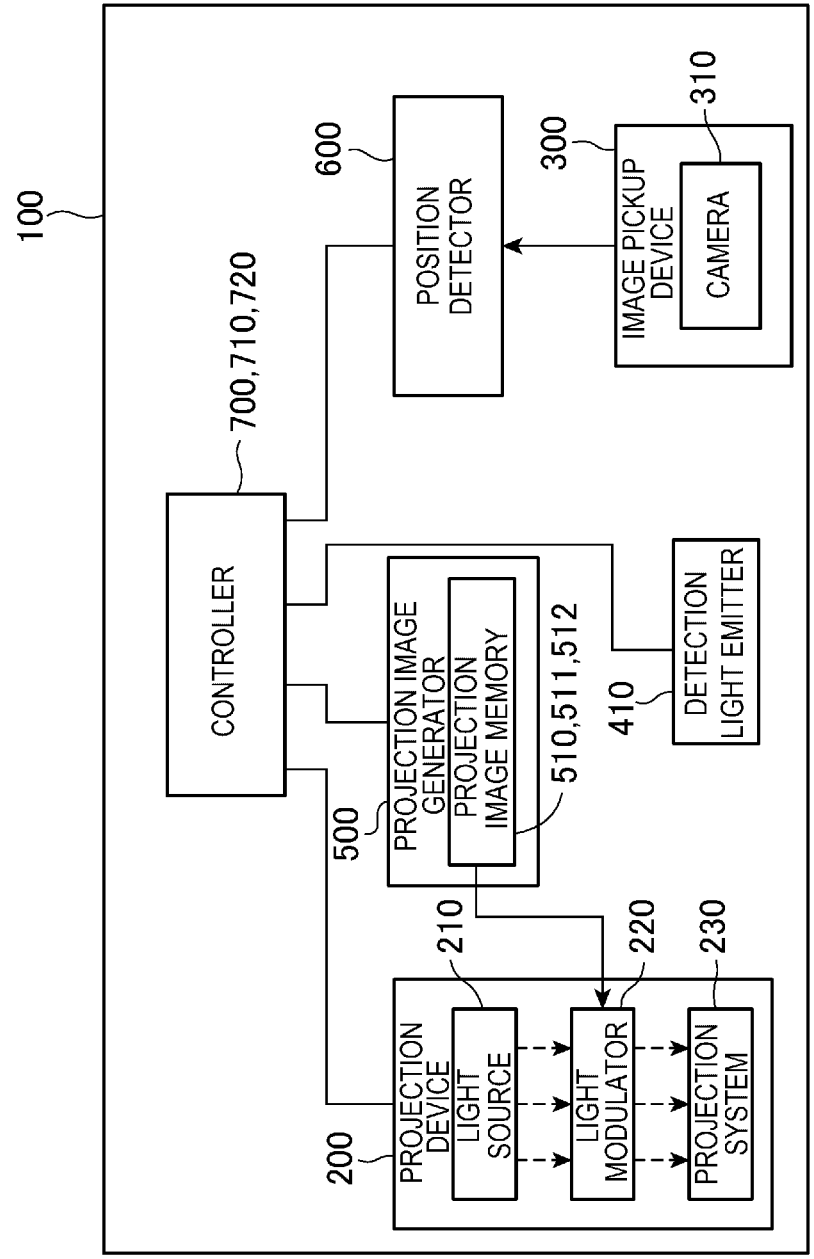
FIG. 4 shows an example of the configuration of a projector according to the embodiment.

FIG. 4 shows an example of the configuration of the projector 100 according to this embodiment.

As shown in FIG. 4, the projector 100 has a projection device 200 including the projection system 230 described with reference to FIGS. 1 to 3, the image pickup device 300 including the camera 310 described with reference to FIGS. 1 to 3, the detection light emitter 410 described with reference to FIGS. 1 to 3, a position detector 600, a projection image generator 500, and a controller 700.

The projector 100 is equivalent to an example of a "display device".

The projection device 200 projects an image processed by the projection image generator 500 onto the screen SC. The projection device 200 has a light source 210, a light modulator 220, and the projection system 230.

The projection device 200 is equivalent to an example of a "display".

The light source 210 is used to display an image and has at least one of a solid-state light source such as an LED or a laser, and a phosphor light source such as a phosphor element.

The light source 210 may also have a reflector and an auxiliary reflector for guiding light emitted from the light source to the light modulator 220. The light source 210 may also have a lens group and a polarizer for improving optical characteristics of projection light, and a dimmer element or the like that reduces the amount of light of the light emitted from the light source, on the path to the light modulator 220.

The light modulator 220 has, for example, three liquid crystal panels, not illustrated, corresponding to the three primary colors of R, G, and B. R represents red. G represents green. B represents blue. That is, the light modulator 220 has a liquid crystal panel corresponding to R color light, a liquid crystal panel corresponding to G color light, and a liquid crystal panel corresponding to B color light.

The light emitted from the light source 210 is separated into color lights of the three colors of RGB, which then become incident on the corresponding liquid crystal panels. Each of the three liquid crystal panels is a transmission-type liquid crystal panel, and modulates light transmitted through the liquid crystal panel and thus generates image light. The image lights transmitted through and thus modulated by the individual liquid crystal panels are combined together by a light combining system such as a cross dichroic prism. The combined light is emitted to the projection system 230.

In this embodiment, a case where the light modulator 220 has a transmission-type liquid crystal panel as a light modulation element is described. However, this is not limiting. The light modulation element may be a reflection-type liquid crystal panel or a digital micromirror device.

The projection system 230 has a lens, a mirror, and the like for causing the image light incident thereon from the light modulator 220 to form an image on the screen SC.

The projection system 230 may also have a zoom mechanism for enlarging or reducing the image projected on the screen SC, a focus adjustment mechanism for adjusting the focus, and the like.

The image pickup device 300 has the camera 310. The camera 310 receives light in a wavelength range including the wavelength of the detection light IDL described with reference to FIG. 3 and thus picks up an image. The camera 310 receives the reflected detection light RDL, which is the reflected light of the detection light IDL emitted from the detection light emitter 410 and reflected by the pointer 80, and thus picks up an image. Therefore, the reflected detection light RDL can be detected from the picked-up image PM picked up by the camera 310.

Preferably, the camera 310 has a function of picking up an image using light including visible light in addition to the function of picking up an image using light including near-infrared light. In this case, the camera 310 can pick up an image of the projection image PS projected on the screen SC, and the projection image generator 500 can execute keystone correction, color correction and the like, using this image.

The position detector 600 detects the reflected detection light RDL from the picked-up image PM picked up by the camera 310. The position detector 600 specifies the position of the image of the detected light in the picked-up image PM and thus detects the position of the pointer 80.

The camera 310, or the camera 310 and the position detector 600, are equivalent to an example of a "detector".

The projection image generator 500 has a projection image memory 510 storing image data corresponding to the projection image PS. The projection image memory 510 is a so-called frame memory storing an image projected by the projection device 200, frame by frame.

The projection image memory 510 has a first projection image memory 511 and a second projection image memory 512.

The first projection image memory 511 stores a first image PT1 corresponding to a handwritten input, based on the result of detection by the position detector 600.

The second projection image memory 512 stores image data corresponding to the projection image PS projected by the projection device 200. The projection image PS includes the first image PT1, a second image PT2, a first frame image PL1, and a second frame image PL2.

The first image PT1, the second image PT2, the first frame image PL1, and the second frame image PL2 will be described along with the description of the controller 700 given below and will be described further with reference to FIG. 5.

In response to an instruction from the controller 700, the projection image generator 500 writes image data in the projection image memory 510, based on the result of detection by the position detector 600.

Also, in response to an instruction from the controller 700, the projection image generator 500 outputs an image signal representing an image in the second projection image memory 512 to the light modulator 220 and causes the projection device 200 to project the projection image PS.

The projection image generator 500 also executes image processing on the projection image PS. For example, the projection image generator 500 executes geometric correction for correcting a keystone distortion of the projection image PS, digital zoom for enlarging or reducing the projection image PS, color correction for correcting the color tone or the like of the projection image PS, and the like.

The controller 700 has a processor 710 and a memory 720.

The processor 710 has a CPU (central processing unit), an MPU (micro-processing unit) or the like.

The processor 710 may be formed of a single processor. Alternatively, a plurality of processors may function as the processor 710. The processor 710 executes a control program and controls each component of the projector 100. In this embodiment, the position detector 600 and the projection image generator 500 are implemented as a part of the controller 700.

The memory 720 is a storage device storing programs and data executed by the processor 710, in a non-volatile manner. The memory 720 is formed of a magnetic storage device, a semiconductor storage device such as a flash ROM (read-only memory), or other types of non-volatile storage devices. The memory 720 may also include a RAM (random-access memory) forming a work area for the processor 710. The memory 720 stores data processed by the controller 700 and a control program executed by the processor 710.

The control program is executed by the processor 710. By having the processor 710 execute the control program stored in the memory 720, the controller 700 controls each component of the projector 100.

The processing by the controller 700 will be described below. Also, specific examples of the processing by the controller 700 will be described with reference to FIGS. 5 to 9.

The controller 700 accepts a first handwritten input to the screen SC, based on the result of detection by the position detector 600. The first handwritten input is a handwritten character, geometric shape, line drawing or the like inputted by the pointer 80 such as a user's hand finger.

The controller 700 also determines a first area AR1 including a position on the screen SC corresponding to the first handwritten input.

The controller 700 also displays the first image PT1 corresponding to the first handwritten input, in the first area AR1.

In this embodiment, the controller 700 displays the first image PT1 in the first area AR1, for example, by executing the processing described below.

First, the controller 700 accepts the first handwritten input. Specifically, the controller 700 generates the first image PT1, based on the position where the first handwritten input is made that is detected by the position detector 600. The controller 700 then causes the projection image generator 500 to write the first image PT1 in each of the first projection image memory 511 and the second projection image memory 512. Subsequently, the controller 700 causes the projection image generator 500 to output an image signal corresponding to the first image PT1 in the second projection image memory 512 to the light modulator 220 and thus causes the projection device 200 to project the first image PT1. In this way, the controller 700 displays the first image PT1 on the screen SC.

The controller 700 also displays a second image PT2 formed by enlarging the first image PT1 with a predetermined enlargement ratio, in a second area AR2 on the screen SC. The predetermined enlargement ratio is, for example, 2×.

In this embodiment, the controller 700 displays the second image PT2 in the second area AR2, for example, by executing the processing described below.

First, the controller 700 generates the second image PT2 formed by enlarging the first image PT1 with the predetermined enlargement ratio. The controller 700 then causes the projection image generator 500 to write the second image PT2 in the second projection image memory 512. Subsequently, the controller 700 causes the projection image generator 500 to output an image signal corresponding to the second image PT2 in the second projection image memory 512 to the light modulator 220 and thus causes the projection device 200 to project the second image PT2. In this way, the controller 700 displays the second image PT2 on the screen SC.

The controller 700 also accepts a second handwritten input to the screen SC, based on the result of detection by the position detector 600. The second handwritten input is a handwritten character, geometric shape, line drawing or the like inputted in the second area AR2 by the pointer 80 such as a user's hand finger.

The controller 700 also updates the second image PT2, based on an image corresponding to the second handwritten input.

The controller 700 updates the second image PT2, based on the image corresponding to the second handwritten input, for example, by executing the processing described below.

First, the controller 700 generates a third image PT3 corresponding to the second handwritten input, based on the result of detection by the position detector 600. The controller 700 then causes the projection image generator 500 to write the third image PT3 at the position in the second area AR2 where the second handwritten input is made, in the second projection image memory 512. The third image PT3 is written in the second projection image memory 512 as a part of the second image PT2. In this way, the controller 700 updates the second image PT2, based on the image corresponding to the second handwritten input.

The controller 700 also displays the image corresponding to the second handwritten input as a part of the first image PT1, at the position in the first area AR1 corresponding to the position in the second area AR2 where the second handwritten input is made, and in a size reduced with a reduction ratio that is the reciprocal of the predetermined enlargement ratio. That is, the controller 700 updates the first image PT1, based on the image corresponding to the second handwritten input.

In this embodiment, the controller 700 updates the first image PT1, based on the image corresponding to the second handwritten input, for example, by executing the processing described below.

First, the controller 700 generates the third image PT3 corresponding to the second handwritten input, based on the result of detection by the position detector 600. The controller 700 then generates a fourth image PT4 formed by reducing the third image PT3 with a reduction ratio that is the reciprocal of the predetermined enlargement ratio. Subsequently, the controller 700 causes the projection image generator 500 to write the fourth image PT4 at the position in the first area AR1 corresponding to the position in the second area AR2 where the second handwritten input is made, in each of the first projection image memory 511 and the second projection image memory 512. The fourth image PT4 is written in each of the first projection image memory 511 and the second projection image memory 512 as a part of the first image PT1. In this way, the controller 700 updates the first image PT1, based on the image corresponding to the second handwritten input.

During the period when the second image PT2 is displayed in the second area AR2, the controller 700 accepts the first handwritten input in the first area AR1. Then, based on the accepted first handwritten input, the controller 700 updates the first image PT1 and displays the updated first image PT1 in the first area AR1.

In this embodiment, the controller 700 displays the updated first image PT1 in the first area AR1, for example, by executing the processing described below.

First, the controller 700 updates the first image PT1, based on the first handwritten input detected by the position detector 600. The controller 700 then causes the projection image generator 500 to write the first image PT1 in each of the first projection image memory 511 and the second projection image memory 512. Subsequently, the controller 700 causes the projection image generator 500 to output an image signal corresponding to the first image PT1 in the second projection image memory 512 to the light modulator 220 and thus causes the projection device 200 to project the first image PT1. In this way, the controller 700 displays the updated first image PT1 on the screen SC.

The controller 700 also displays a first frame image PL1 showing the outer edge of the first area AR1 and a second frame image PL2 showing the outer edge of the second area AR2, on the screen SC.

The first frame image PL1 is equivalent to an example of a "first area image". The second frame image PL2 is equivalent to an example of a "second area image".

In this embodiment, the controller 700 displays the first frame image PL1 and the second frame image PL2 on the screen SC, for example, by executing the processing described below.

First, the controller 700 determines the first area AR1 including the position on the screen SC corresponding to the first handwritten input. The size of the first area AR1 is, for example, a predetermined size. The size of the first area AR1 may be able to be set by the user. Subsequently, the controller 700 determines the second area AR2 on the screen SC. The controller 700 determines the second area AR2, for example, at a position that does not overlap the first area AR1.

Subsequently, the controller 700 generates the first frame image PL1 and the second frame image PL2. The controller 700 then causes the projection image generator 500 to write the first frame image PL1 and the second frame image PL2 thus generated, in the second projection image memory 512. Next, the controller 700 causes the projection image generator 500 to output an image signal corresponding to the first frame image PL1 and the second frame image PL2 in the second projection image memory 512 to the light modulator 220 and thus causes the projection device 200 to project the first frame image PL1 and the second frame image PL2. In this way, the controller 700 displays the first frame image PL1 and the second frame image PL2 on the screen SC.

Thus, in the first projection image memory 511, the first image PT1 is written, based on the first handwritten input and the second handwritten input. In the second projection image memory 512, the first image PT1, the second image PT2, the first frame image PL1, and the second frame image PL2 are written.

The first image PT1, the second image PT2, the first frame image PL1, and the second frame image PL2 written in the second projection image memory 512 are outputted to the light modulator 220 by the projection image generator 500 and projected onto the screen SC by the projection device 200.

Specific examples of the processing by the controller 700 will now be described with reference to FIGS. 5 to 8.

Figure 5:
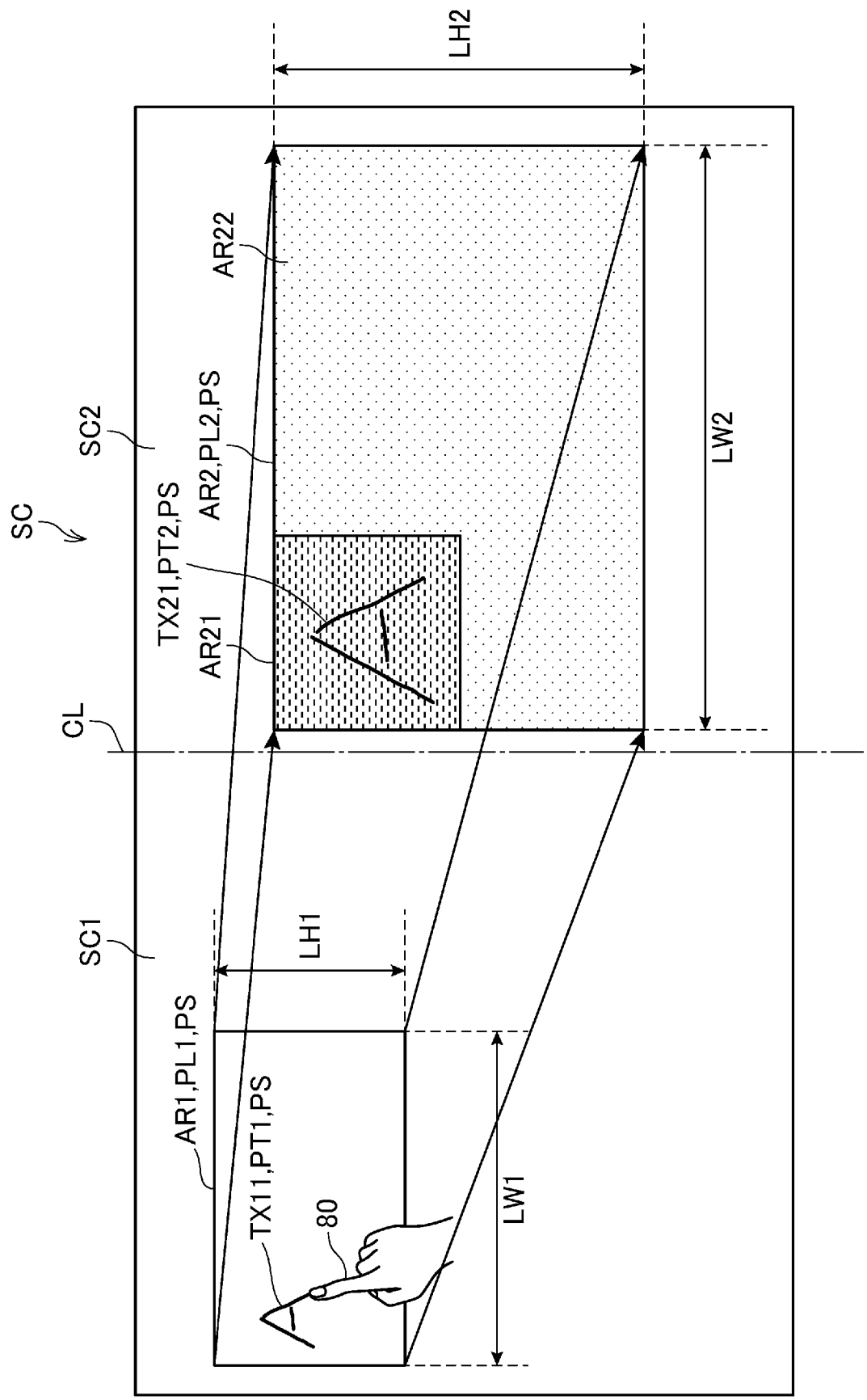
FIG. 5 shows a first specific example of processing by a controller.

FIG. 5 shows a first specific example of the processing by the controller 700.

Referring to FIG. 5, first, the processing in which the controller 700 accepts the first handwritten input and displays the first image PT1 and the first frame image PL1 corresponding to the first handwritten input will be described.

The controller 700 accepts the first handwritten input and determines the first area AR1. The first area AR1 includes the position of the first handwritten input. In FIG. 5, the first area AR1 is arranged, for example, at the top left of a left area SC1 on the screen SC, that is, on one side along the long side of the screen SC. The first area AR1 is a rectangular area having a width LW1 and a height LH1.

The controller 700 generates the first image PT1, based on the position of the first handwritten input detected by the position detector 600. In FIG. 5, a first text image TX11 representing the letter "A" of the alphabet is generated as the first image PT1.

The controller 700 displays the first text image TX11 in the first area AR1 on the screen SC. In this embodiment, the controller 700 displays the first text image TX11 on the screen SC, for example, by executing the processing described below.

First, the controller 700 causes the projection image generator 500 to write the first text image TX11 in each of the first projection image memory 511 and the second projection image memory 512. Subsequently, the controller 700 causes the projection image generator 500 to output an image signal corresponding to the first text image TX11 in the second projection image memory 512 to the light modulator 220 and thus causes the projection device 200 to project the first text image TX11. In this way, the controller 700 displays the first text image TX11 on the screen SC.

The controller 700 displays the first frame image PL1 in the first area AR1 on the screen SC. In this embodiment, the controller 700 displays the first frame image PL1 on the screen SC, for example, by executing the foregoing processing.

Since the first frame image PL1 is displayed on the screen SC in this way, the user can easily view the first area AR1 where the first handwritten input is accepted. Therefore, the user can easily make the first handwritten input in the first area AR1. Also, a configuration where the first frame image PL1 is not displayed may be employed.

The processing in which the controller 700 displays the second image PT2 and the second frame image PL2 will now be described.

When the controller 700 has accepted the first handwritten input, the controller 700 determines the second area AR2 at a position that does not overlap the first area AR1. The second area AR2 is arranged, for example, at the center of a right area SC2 on the screen SC. That is, the second area AR2 is arranged on the other side along the long side of the screen SC. The second area AR2 is a rectangular area having a width LW2 and a height LH2. The width LW2 is, for example, twice the width LW1 of the first area AR1. The height LH2 is, for example, twice the height LH1 of the first area AR1. Twice is equivalent to an example of the "predetermined enlargement ratio". The controller 700 determines the second area AR2 in response to the acceptance of the first handwritten input. Therefore, the second area AR2 is displayed without the user performing an operation to enlarge the first image PT1.

The second area AR2 includes a display area AR21 and a blank area AR22. The display area AR21 represents an area where the second image PT2 is displayed. The blank area AR22 represents an area excluding the display area AR21, of the second area AR2.

The controller 700 determines the second area AR2 in such a way that the area of the blank area AR22 is larger than the area of the display area AR21.

The controller 700 displays the second frame image PL2 on the screen SC. In this embodiment, the controller 700 displays the second frame image PL2 on the screen SC, for example, by executing the foregoing processing.

Since the second frame image PL2 is displayed on the screen SC in this way, the user can easily view the second area AR2 where the second handwritten input is accepted. Therefore, the user can easily make the second handwritten input in the second area AR2. Also, a configuration where the second frame image PL2 is not displayed may be employed.

The controller 700 displays the second image PT2 on the screen SC. In this embodiment, the controller 700 displays the second image PT2 on the screen SC, for example, by executing the processing described below.

The controller 700 generates the second image PT2 formed by enlarging the first image PT1 by two times. The controller 700 then causes the projection image generator 500 to write the second image PT2 in the second projection image memory 512. Subsequently, the controller 700 causes the projection image generator 500 to output an image signal corresponding to the second image PT2 in the second projection image memory 512 to the light modulator 220 and thus causes the projection device 200 to project the second image PT2. In this way, the controller 700 displays the second image PT2 on the screen SC.

In the above description, for the sake of convenience, the case where when the controller 700 has accepted the first handwritten input, the controller 700 determines the second area AR2 and displays the second image PT2, is described. However, the controller 700 may decide the second area AR2 and display the second image PT2 when the first handwritten input satisfies a particular condition.

The controller 700 may display the second image PT2 in the second area AR2, for example, when the first handwritten input includes touch operations performed a predetermined number of times or more within a range having a predetermined area on the screen SC. The touch operation refers to an operation in which the pointer 80 shifts from a non-touching state to a touching state on the screen SC. The predetermined area is, for example, 9 cm$^2$. The predetermined number of times is, for example, 5. When the area where the first handwritten input is made is larger than the predetermined area, or when the touch operation is performed fewer times than the predetermined number of times, the controller 700 does not display the second image PT2.

The non-touching state refers to the state where the pointer 80 is further apart from the screen SC than detection light IDL1 shown in FIG. 3. The touching state refers to the state where the pointer 80 is closer to the screen SC than the detection light IDL1 shown in FIG. 3. Whether the pointer 80 is in the non-touching state or in the touching state is detected by the position detector 600.

In this case, the second image PT2 is displayed in the second area AR2 when the first handwritten input corresponds to a complex character, geometric shape, line drawing or the like. For example, when inputting a complex character by handwriting, the user finds it difficult to input a small character in a narrow area.

Therefore, the user makes the second handwritten input in the second area AR2 having a larger area than the first area AR1, instead of making the first handwritten input in the first area AR1, and thus inputs a complex character or the like in the first area AR1. Thus, the user can easily input a complex character, geometric shape, line drawing or the like in the first area AR1.

Meanwhile, when making a handwritten input in a broad area or when the content of the input is simple, the user may find it rather troublesome if the second image PT2 is displayed. Not displaying the second image PT2 when the condition is not satisfied can further improve usability.

Figure 6:
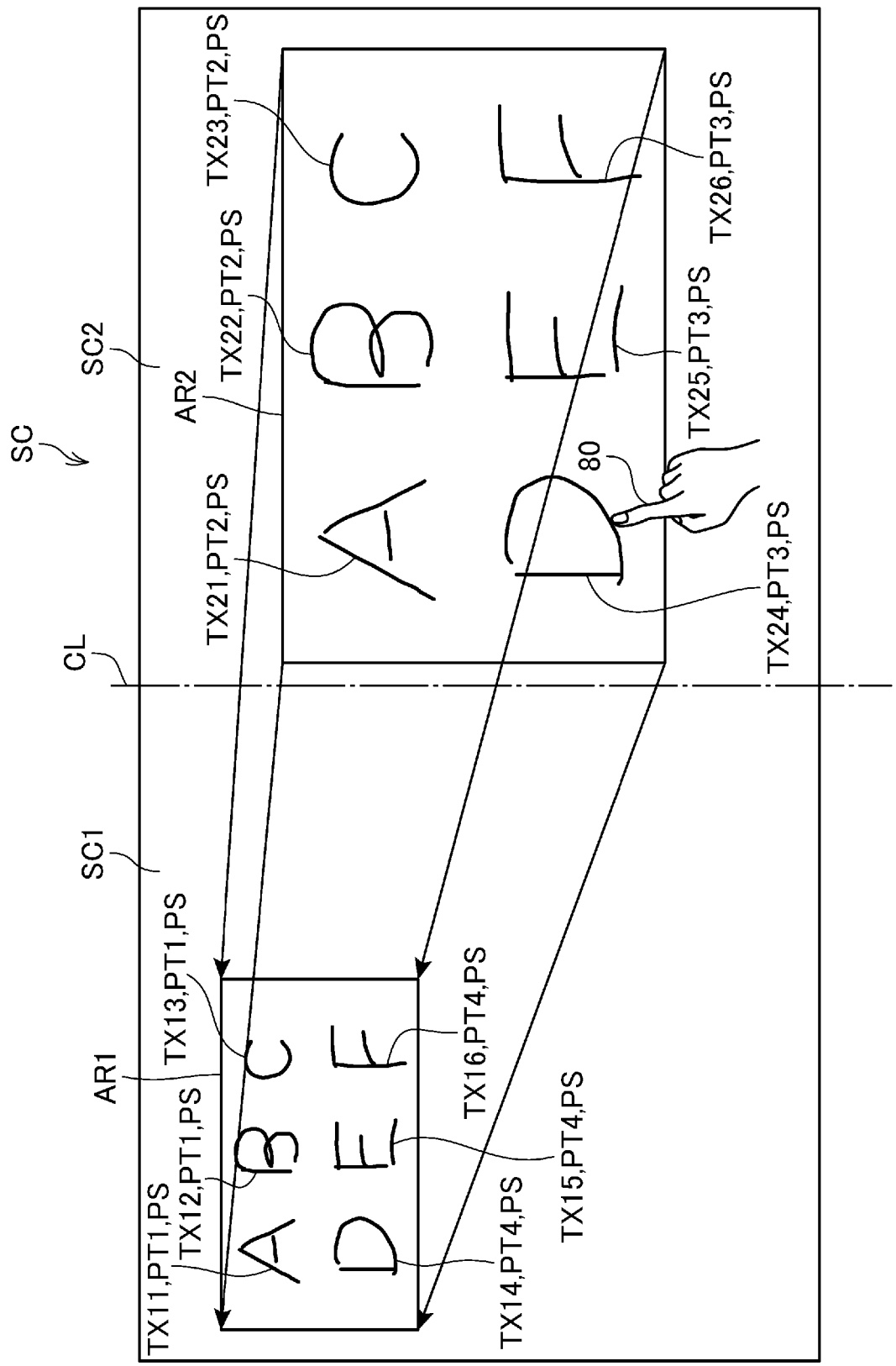
FIG. 6 shows a second specific example of processing by the controller.

FIG. 6 shows a second specific example of the processing by the controller 700.

In FIG. 6, the controller 700 displays the third image PT3 forming a part of the second image PT2 and the fourth image PT4 forming a part of the first image PT1 on the screen SC, based on the second handwritten input made in the second area AR2.

In the first area AR1, a first text image TX11, a first text image TX12, and a first text image TX13, and a fourth text image TX14, a fourth text image TX15, and a fourth text image TX16 are displayed.

The first text images TX11 to TX13 are equivalent to an example of the first image PT1 generated based on the first handwritten input. The fourth text images TX14 to TX16 are equivalent to an example of the fourth image PT4 generated based on the second handwritten input. The fourth image PT4 forms a part of the first image PT1. That is, the first image PT1 includes the first text images TX11 to TX13 and the fourth text images TX14 to TX16.

The first text image TX12 and the first text image TX13 are displayed on the screen SC similarly to the first text image TX11 described with reference to FIG. 5.

In the second area AR2, a second text image TX21, a second text image TX22, and a second text image TX23, and a third text image TX24, a third text image TX25, and a third text image TX26 are displayed.

The second text image TX22 and the second text image TX23 are displayed on the screen SC similarly to the second text image TX21 described with reference to FIG. 5.

The second text images TX21 to TX23 are equivalent to an example of the second image PT2 generated based on the first handwritten input. The third text images TX24 to TX26 are equivalent to an example of the third image PT3 generated based on the second handwritten input. The third image PT3 forms a part of the second image PT2. That is, the second image PT2 includes the second text images TX21 to TX23 and the third text images TX24 to TX26.

First, an example of the processing in which the controller 700 displays the third text images TX24 to TX26 on the screen SC will be described.

The controller 700 generates the third text images TX24 to TX26 corresponding to the second handwritten input, based on the result of detection by the position detector 600. The controller 700 then causes the projection image generator 500 to write the third text images TX24 to TX26 at the position in the second area AR2 where the second handwritten input is made, in the second projection image memory 512. The third text images TX24 to TX26 are written in the second projection image memory 512 as a part of the second image PT2. In this way, the second image PT2 is updated, based on the image corresponding to the second handwritten input.

The third text images TX24 to TX26 are displayed on the screen SC similarly to the second image PT2. Specifically, the controller 700 causes the projection image generator 500 to output an image signal corresponding to the third text images TX24 to TX26 in the second projection image memory 512 to the light modulator 220 and thus causes the projection device 200 to project the third text images TX24 to TX26. In this way, the controller 700 displays the third text images TX24 to TX26 on the screen SC.

An example of the processing in which the controller 700 displays the fourth text images TX14 to TX16 on the screen SC will now be described.

The controller 700 generates the fourth text images TX14 to TX16 formed by reducing each of the third text images TX24 to TX26 in size with a reduction ratio (in this example, 1/2) that is the reciprocal of the predetermined enlargement ratio. Subsequently, the controller 700 causes the projection image generator 500 to write the fourth text images TX14 to TX16 at the position in the first area AR1 corresponding to the position in the second area AR2 where the second handwritten input is made, in each of the first projection image memory 511 and the second projection image memory 512. The fourth text images TX14 to TX16 are written in each of the first projection image memory 511 and the second projection image memory 512, as a part of the first image PT1. In this way, the first image PT1 is updated, based on the image corresponding to the second handwritten input.

The fourth text images TX14 to TX16 are displayed on the screen SC similarly to the first image PT1. Specifically, the controller 700 causes the projection image generator 500 to output an image signal corresponding to the fourth text images TX14 to TX16 in the second projection image memory 512 to the light modulator 220 and thus causes the projection device 200 to project the fourth text images TX14 to TX16. In this way, the controller 700 displays the fourth text images TX14 to TX16 on the screen SC.

A method for adjusting the positions of the first area AR1 and the second area AR2 when the position of the first handwritten input moves will now be described with reference to FIGS. 7 and 8.

Referring to FIGS. 7 and 8, for the sake of convenience, a case where the controller 700 determines the first area AR1 in such a way that the position of the pointer 80 is the center position in the first area AR1 is described.

FIG. 7 shows a third specific example of the processing by the controller 700.

A case where the pointer 80 starts a handwritten input at the center of the screen SC and moves to the right by a distance MH1 as the writing progresses, as shown in the illustration at the top of FIG. 7, will now be described.

In this case, at the point when the handwritten input is started, the controller 700 determines the position of the first area AR1 with the center thereof placed at the center of the screen SC, based on the position of the pointer 80, as shown in the illustration at the top of FIG. 7. The second area AR2 is displayed at a position that does not overlap the first area AR1. For example, in the illustration at the top of FIG. 7, the second area AR2 is displayed to the right of the first area AR1. The position detector 600 repeatedly detects the position of the pointer 80. Based on the result of the detection by the position detector 600, the controller 700 moves the first area AR1 to the right by a distance MA11 and moves the second area AR2 to the right by a distance MA21, as shown in the illustration at the bottom of FIG. 7.

The distance MA11 and the distance MA21 coincide, for example, with the distance MH1.

In the state shown in the illustration at the bottom of FIG. 7, the right end of the first area AR1 is in contact with the left end of the second area AR2, and the right end of the second area AR2 is located at the right end of the screen SC. Therefore, it is difficult to move the first area AR1 further to the right.

FIG. 8 shows a fourth specific example of the processing by the controller 700. FIG. 8 shows an example of a method of moving the first area AR1 further to the right from the state shown in the illustration at the bottom of FIG. 7.

The positions of the first area AR1 and the second area AR2 shown in the illustration at the top of FIG. 8 are the same as the positions of the first area AR1 and the second area AR2 shown in the illustration at the bottom of FIG. 7. A case where the position of the pointer 80 moves to the right by a distance MH2, as shown in the illustration at the top of FIG. 8, will now be described.

In this case, the controller 700 moves the first area AR1 to the right by a distance MA12 and moves the second area AR2 by a distance MA22 in such a way that the left end of the second area AR2 is located at the left end of the screen SC, as shown in the illustration at the bottom of FIG. 8.

The distance MA12 coincides, for example, with the distance MH2.

In the state shown in the illustration at the bottom of FIG. 8, the left end of the second area AR2 is located at the left end of the screen SC. The left end of the first area AR1 is located at a position spaced apart from the right end of the second area AR2, for example, by the distance MA12.

Moving the second area AR2 with the movement of the first area AR1 in this way enables the second area AR2 to be determined at a position that does not overlap the first area AR1.

When the second area AR2 is moved from the right end of the screen SC to the left end of the screen SC, as shown in the illustration at the bottom of FIG. 8, a character, a geometric shape or the like may have already been placed at the position where the second area AR2 is arranged. Even in such a case, the controller 700 arranges the second area AR2 in such a way as to overlay the character, geometric shape or the like placed at the location where the second area AR2 is arranged, in order to make the second area AR2 available for use. In other words, the controller 700 arranges the second area AR2 at the layer over the character, geometric shape or the like placed at the position where the second area AR2 is arranged.

As shown in the illustration at the bottom of FIG. 8, the width LW1 of the first area AR1, the width LW2 of the second area AR2, and a width LWS of the screen SC satisfy the following formula (1):

$$LW1 + 2 \times LW2 \leq LWS \qquad (1).$$

In this embodiment, the width LW2 is twice the width LW1. Therefore, based on the formula (1), the following formula (2) holds:

$$5 \times LW1 \leq LWS \qquad (2).$$

Based on the formula (2), the width LW1 of the first area AR1 needs to be set to 1/5 of the width LWS of the screen SC or less. A height LHS represents the height of the screen SC.

For example, when the width LW2 is MG times the width LW1, the following formula (3) holds, based on the formula (1):

$$(1 + 2 \times MG) \times LW1 \leq LWS \qquad (3).$$

The controller 700 may decide the width LW1, the width LW2, and the positions of the first area AR1 and the second area AR2 on the screen SC, based on the formula (3). The width LWS and the height LHS can be calculated from an image acquired by the image pickup device 300.

Figure 9:
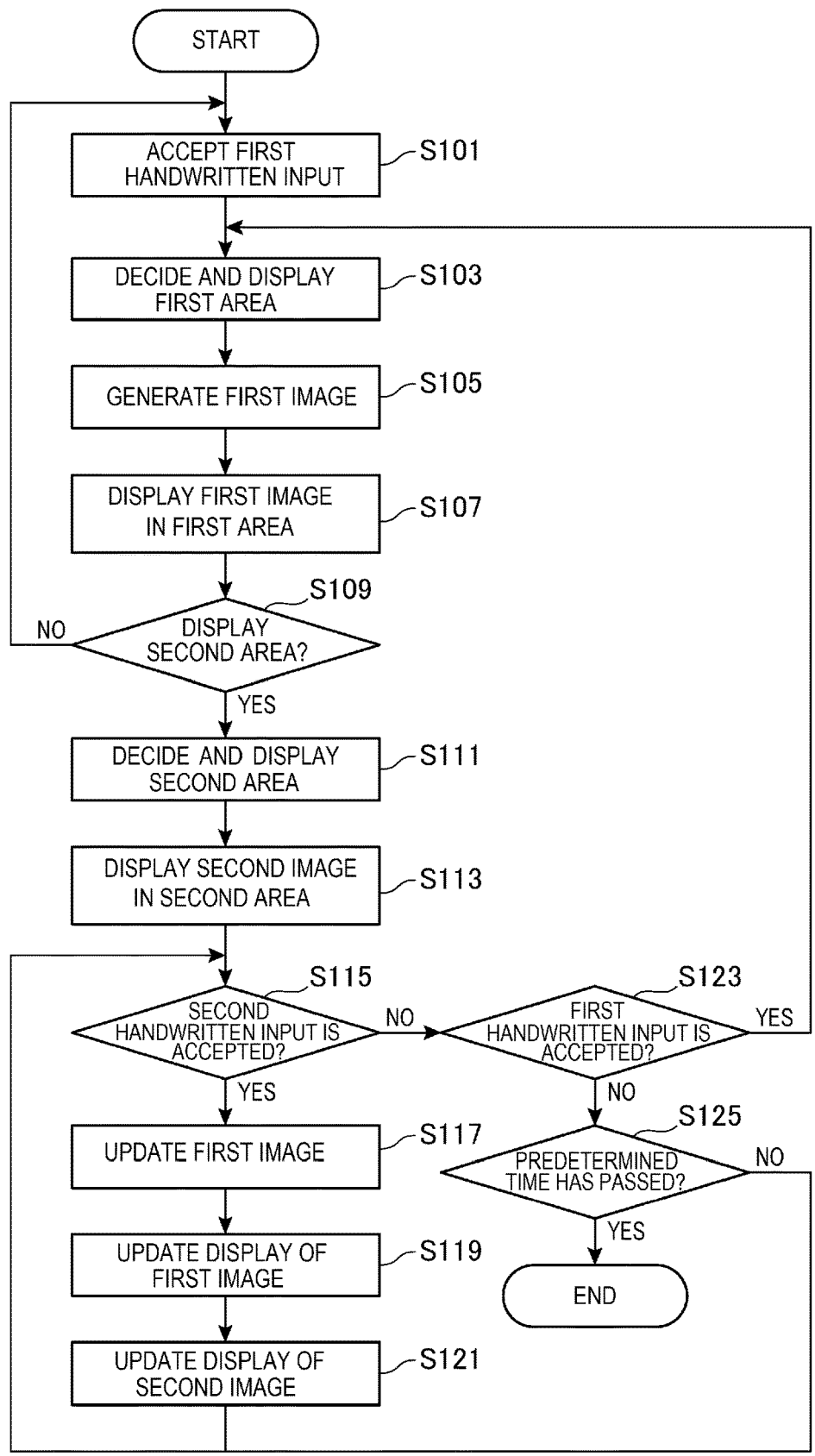
FIG. 9 is a flowchart showing an example of processing by the controller.

FIG. 9 is a flowchart showing an example of the processing by the controller 700.

As shown in FIG. 9, first, in step S101, the controller 700 accepts a first handwritten input.

Next, in step S103, the controller 700 determines the first area AR1 including a position on the screen SC corresponding to the first handwritten input. The controller 700 then generates the first frame image PL1 representing the outer edge of the first area AR1 and displays the first frame image PL1 on the screen SC.

Next, in step S105, the controller 700 generates the first image PT1 corresponding to the first handwritten input.

Next, in step S107, the controller 700 displays the first image PT1 in the first area AR1.

Next, in step S109, the controller 700 determines whether to display the second area AR2 or not. The controller 700 determines whether to display the second area AR2 or not, for example, based on whether the first handwritten input satisfies a particular condition or not. The particular condition is, for example, that the first handwritten input includes touch operations performed a predetermined number of times or more in a range having a predetermined area on the screen SC.

When the controller 700 determines that the second area AR2 is not to be displayed (NO in step S109), the processing returns to step S101. When the controller 700 determines that the second area AR2 is to be displayed (YES in step S109), the processing proceeds to step S111.

In step S111, the controller 700 determines the second area AR2 at a position that does not overlap the first area AR1. When the first area AR1 moves due to the movement of the first handwritten input, the controller 700 moves the second area AR2 to a position that does not overlap the first area AR1. The controller 700 then generates the second frame image PL2 representing the outer edge of the second area AR2 and displays the second frame image PL2 on the screen SC.

Next, in step S113, the controller 700 generates the second image PT2 formed by enlarging the first image PT1 with a predetermined enlargement ratio (for example, 2×) and displays the second image PT2 in the second area AR2 on the screen SC.

Next, in step S115, the controller 700 determines whether a second handwritten input is accepted in the second area AR2 or not.

When the controller 700 determines that a second handwritten input is not accepted in the second area AR2 (NO in step S115), the processing proceeds to step S123. When the controller 700 determines that a second handwritten input is accepted in the second area AR2 (YES in step S115), the processing proceeds to step S117.

In step S117, the controller 700 updates the first image PT1, based on the second handwritten input. That is, the controller 700 generates an image corresponding to the second handwritten input as a part of the first image PT1, at the position in the first area AR1 corresponding to the position in the second area AR2 where the second handwritten input is made, and in a size reduced with a reduction ratio (for example, 1/2) that is the reciprocal of the predetermined enlargement ratio. In this way, the controller 700 updates the first image PT1, based on the image corresponding to the second handwritten input.

Next, in step S119, the controller 700 updates the display of the first image PT1. In other words, the controller 700 displays the updated first image PT1 in the first area AR1 on the screen SC.

Next, in step S121, the controller 700 enlarges the updated first image PT1 with a predetermined enlargement ratio (for example, 2×) and thus updates the second image PT2. The controller 700 then displays the updated second image PT2 in the second area AR2 on the screen SC. Subsequently, the processing returns to step S115.

When NO in step S115, the controller 700 in step S123 determines whether a first handwritten input is accepted in the first area AR1 or not.

When the controller 700 determines that a first handwritten input is accepted (YES in step S123), the processing returns to step S103. When the controller 700 determines that a first handwritten input is not accepted (NO in step S123), the processing proceeds to step S125.

In step S125, the controller 700 determines whether or not a predetermined time has passed since it is determined in step S123 that a first handwritten input and a second handwritten input are not accepted. The predetermined time is, for example, 5 minutes.

When the controller 700 determines that the predetermined time has not passed (NO in step S125), the processing returns to step S115. When the controller 700 determines that the predetermined time has passed (YES in step S125), the processing ends.

As described with reference to FIG. 9, by making the second handwritten input in the second area AR2, the first image PT1 in the first area AR1 can be updated. Thus, the convenience of the user can be improved.

For example, the first image PT1 representing a complex character, geometric shape, line drawing or the like can be displayed in the first area AR1 in the following manner. That is, the user makes the second handwritten input in a size formed by enlarging the first handwritten input with a predetermined enlargement ratio (for example, 2×), in the second area AR2 having a larger area than the first area AR1, instead of making the first handwritten input in the first area AR1. The first image PT1 can thus be displayed in the first area AR1.

As described above with reference to FIGS. 1 to 9, the display method according to the embodiment includes accepting a first handwritten input to the screen SC, determining the first area AR1 including the position on the screen SC where the first handwritten input is made, displaying the first image PT1 corresponding to the first handwritten input in the first area AR1, displaying the second image PT2 formed by enlarging the first image PT1 with a predetermined enlargement ratio, in the second area AR2 on the screen SC, accepting a second handwritten input in the second area AR2, and displaying an image corresponding to the second handwritten input as a part of the first image PT1, at the position in the first area AR1 corresponding to the position in the second area AR2 where the second handwritten input is made, and in a size reduced with a reduction ratio that is the reciprocal of the predetermined enlargement ratio.

That is, when the second handwritten input is accepted, the image corresponding to the second handwritten input is displayed as a part of the first image PT1, at the position in the first area AR1 corresponding to the position in the second area AR2 where the second handwritten input is made, in a size reduced with a reduction ratio (for example, 1/2) that is the reciprocal of the predetermined enlargement ratio (for example, 2×). Therefore, by the second handwritten input in the second area AR2, a complex character, geometric shape, line drawing or the like can be inputted as the first image PT1. Thus, the operability of the handwritten input by the user can be improved.

The display method according to the embodiment also includes determining the second area AR2 at a position that does not overlap the first area AR1 on the screen SC.

Since the second area AR2 does not overlap the first area AR1, the user can check the display content in the first area AR1 while making the second handwritten input in the second area AR2. Thus, the operability of the handwritten input by the user can be improved.

In the display method according to the embodiment, the screen SC is a rectangle having a long side and a short side. In determining the first area AR1, the first area AR1 is arranged on one side along the long side of the screen SC. In determining the second area AR2, the second area AR2 is arranged on the other side along the long side of the screen SC.

The first area AR1 and the second area AR2 are arranged along the long side of the screen SC. Therefore, the second area AR2 can be arranged more easily than when the first area AR1 and the second area AR2 are arranged along the short side. Thus, the operability of the handwritten input by the user can be improved.

When the first handwritten input is being executed in the first area AR1, the second image PT2 formed by enlarging the first image PT1 with a predetermined enlargement ratio is displayed in the second area AR2. Therefore, for example, in a classroom where the long side of the screen SC is in the left-right direction and, when a teacher is executing the first handwritten input in the first area AR1, a student can easily view the second image PT2 displayed in the second area AR2, which is not obstructed by the teacher's body.

In the display method according to the embodiment, the second area AR2 includes the display area AR21, where the second image PT2 is displayed, and the blank area AR22, which is an area excluding the display area AR21. The blank area AR22 has a larger area than the display area AR21.

Since the blank area AR22 has a larger area than the display area AR21, the second handwritten input in the second area AR2 can be easily executed. Thus, the operability of the handwritten input by the user can be improved.

In the display method according to the embodiment, accepting the first handwritten input includes accepting the first handwritten input in the first area AR1 during a period when the second image PT2 is displayed in the second area AR2.

That is, the user may make either one of the second handwritten input in the second area AR2 and the first handwritten input in the first area AR1. Thus, the operability of the handwritten input by the user can be improved.

In the display method according to the embodiment, displaying the second image PT2 in the second area AR2 includes displaying the second image PT2 in the second area AR2 when the first handwritten input includes touch operations performed a predetermined number of times or more in a range having a predetermined area on the screen SC.

Therefore, when inputting, for example, a complex character, geometric shape, line drawing or the like as the first handwritten input, the second area AR2 is displayed. Thus, the second area AR2 can be displayed at a proper timing.

The display method according to the embodiment also includes moving the position of the second area AR2 on the screen SC according to the position on the screen SC where the first handwritten input is made.

Therefore, even when the position of the first handwritten input is moved, the second area AR2 can be determined at a position that does not overlap the first area AR1.

The display method according to the embodiment also includes displaying the first frame image PL1 representing the outer edge of the first area AR1 on the screen SC, and displaying the second frame image PL2 representing the outer edge of the second area AR2 on the screen SC.

Therefore, the user can easily recognize the first area AR1 and the second area AR2, based on the first frame image PL1 and the second frame image PL2. The user can thus easily execute the first handwritten input in the first area AR1 and the second handwritten input in the second area AR2. Thus, the operability of the handwritten input by the user can be improved.

The projector 100 according to the embodiment includes the projection device 200 displaying an image on the screen SC, the position detector 600 detecting the position of a handwritten input to the screen SC, and the controller 700 controlling the image displayed on the screen SC, based on the result of detection by the position detector 600. The controller 700 executes accepting a first handwritten input to the screen SC, based on the result of detection by the position detector 600, determining the first area AR1 including the position on the screen SC where the first handwritten input is made, displaying the first image PT1 corresponding to the first handwritten input in the first area AR1, displaying the second image PT2 formed by enlarging the first image PT1 with a predetermined enlargement ratio, in the second area AR2 on the screen SC, accepting a second handwritten input in the second area AR2, according to the result of detection by the position detector 600, and displaying an image corresponding to the second handwritten input as a part of the first image PT1, at the position in the first area AR1 corresponding to the position in the second area AR2 where the second handwritten input is made, and in a size reduced with a reduction ratio that is the reciprocal of the predetermined enlargement ratio.

That is, when the second handwritten input is accepted, the image corresponding to the second handwritten input is displayed as a part of the first image PT1, at the position in the first area AR1 corresponding to the position in the second area AR2 where the second handwritten input is made, in a size reduced with a reduction ratio (for example, 1/2) that is the reciprocal of the predetermined enlargement ratio (for example, 2×). Therefore, by the second handwritten input in the second area AR2, a complex character, geometric shape, line drawing or the like can be inputted as the first image PT1. Thus, the operability of the handwritten input by the user can be improved.

The above embodiment is a preferred embodiment. However, the above embodiment is not limiting. Various modification examples can be made without departing from the spirit and scope of the present disclosure.

While the case where the predetermined enlargement ratio is 2× is described in the embodiment, the predetermined enlargement ratio may be any value higher than 1×. For example, the predetermined enlargement ratio may be 1× or 1.5×. The predetermined enlargement ratio may be higher than 2×. For example, the predetermined enlargement ratio may be 3× or 5×. Preferably, the predetermined enlargement ratio is 1.5× to 3× in order to facilitate the second handwritten input such as a complex character, geometric shape or line drawing in the second area AR2.

In the embodiment, the controller 700 determines that the second area AR2 is to be displayed, when the first handwritten input is made or when the first handwritten input includes touch operations performed a predetermined number of times or more in a range having a predetermined area on the screen SC. However, this is not limiting. For example, the controller 700 may determine that the second area AR2 is to be displayed, when the first handwritten input is an input of a character.

In the embodiment, the case where the first area AR1 is determined according to the position at which the first handwritten input is made and where the second area AR2 is determined according to the first area AR1, is described. However, this is not limiting. For example, the second area AR2 may be determined according to the position of the second handwritten input. In this case, the position of the second area AR2 can be determined more properly.

Each functional element shown in FIG. 4 represents a functional configuration and is not particularly limited to any specific form of installation. That is, individual pieces of hardware corresponding to the respective functional elements need not necessarily be installed. A single processor can execute a program to implement functions of a plurality of functional elements. Also, a part of the functions implemented by software in the embodiment may be implemented by hardware, and a part of the functions implemented by hardware may be implemented by software. Moreover, any change can be made to the specific details of the configuration of the other elements of the projector 100 without departing from the spirit and scope of the present disclosure.

The processing steps in the flowchart of FIG. 9 are provided by dividing the processing according to the main processing content in order to facilitate understanding of the processing by the controller 700. The way the processing is divided into steps and the names thereof shown in the flowchart of FIG. 9 are not limiting. Depending on the processing content, the processing can be divided into more processing steps and can be divided in such a way that one processing step includes further processing. The processing order in the flowchart is not limited to the illustrated example, either.

The display method for the projector 100 can be implemented by causing the processor 710 provided in the projector 100 to execute a control program corresponding to the display method for the projector 100. The control program can be recorded in a computer-readable recording medium. As the recording medium, a magnetic or optical recording medium, or a semiconductor memory device can be used. Specifically, a portable recording medium such as a flexible disk, an HDD (hard disk drive), a CD-ROM (compact disk read-only memory), a DVD (digital versatile disc), a Blu-ray (trademark registered) disc, a magneto-optical disk, a flash memory or a card-type recording medium, or a fixed recording medium may be employed. The recording medium may also be a non-volatile storage device such as a RAM, a ROM or an HDD that is an internal storage device provided in the projector 100. The control program corresponding to the display method for the projector 100 can be stored in a server device in advance and can be downloaded from the server device to the projector 100, thus implementing the display method for the projector 100.

While the projector 100 is described as an example in the embodiment, the display device may be a touch panel display having a light source and a display panel used to display an image, and a touch sensor.

What is claimed is:

1. A display method comprising:
accepting a first handwritten input to a display surface;
determining a first area including a position on the display surface where the first handwritten input is made;
displaying a first image corresponding to the first handwritten input in the first area;
copying the first image;
displaying a second image formed by enlarging the copied first image with a predetermined enlargement ratio, in a second area on the display surface, the second image being identical to the first image except size;
accepting a second handwritten input in the second area;
displaying a display of the second handwritten input in the second area;
copying the display of the second handwritten input; and
displaying an image corresponding to the copied display of the second handwritten input as a part of the first image, at a position in the first area corresponding to a position in the second area where the second handwritten input is made, and in a size reduced with a reduction ratio that is a reciprocal of the predetermined enlargement ratio, the image being identical to the copied display of the second handwritten input except size, wherein
the first area is a continuous area having a first portion where the first handwritten input is accepted and a second portion where the image corresponding to the second handwritten input is displayed,
the second area is a continuous area having a third portion where the first image is displayed and a fourth portion where the second handwritten input is accepted, and the first area and the second area do not overlap each other.

2. The display method according to claim 1, wherein
the display surface is a rectangle having a long side and a short side,
in determining the first area, the first area is arranged on one side along the long side of the display surface, and
in determining the second area, the second area is arranged on the other side along the long side of the display surface.

3. The display method according to claim 1, wherein
the second area includes a display area where the second image is displayed, and a blank area and
the blank area has a larger area than the display area.

4. The display method according to claim 1, wherein
the accepting the first handwritten input includes accepting the first handwritten input in the first area during a period when the second image is displayed in the second area.

5. The display method according to claim 1, wherein
the displaying the second image in the second area includes displaying the second image in the second area when the first handwritten input includes touch operations performed a predetermined number of times or more in a range having a predetermined area on the display surface.

6. The display method according to claim 1, further comprising:
moving a position of the second area on the display surface according to a position on the display surface where the first handwritten input is made.

7. The display method according to claim 1, further comprising:
displaying a first area image representing an outer edge of the first area on the display surface; and
displaying a second area image representing an outer edge of the second area on the display surface.

8. A display device comprising:
a display displaying an image on a display surface;
a detector detecting a position of a handwritten input to the display surface; and
at least one processor controlling the image displayed on the display surface, based on a result of detection by the detector,
the at least one processor executing:
accepting a first handwritten input to the display surface, based on a result of detection by the detector;
determining a first area including a position on the display surface where the first handwritten input is made;
displaying a first image corresponding to the first handwritten input in the first area;
copying the first image;
displaying a second image formed by enlarging the copied first image with a predetermined enlargement ratio, in a second area on the display surface, the second image being identical to the first image except size;
accepting a second handwritten input in the second area, according to a result of detection by the detector;
displaying a display of the second handwritten input in the second area;

copying the display of the second handwritten input; and displaying an image corresponding to the copied display of the second handwritten input as a part of the first image, at a position in the first area corresponding to a position in the second area where the second handwritten input is made, and in a size reduced with a reduction ratio that is a reciprocal of the predetermined enlargement ratio, the image being identical to the copied display of the second handwritten input except size, wherein the first area is a continuous area having a first portion where the first handwritten input is accepted and a second portion where the image corresponding to the second handwritten input is displayed, the second area is a continuous area having a third portion where the first image is displayed and a fourth portion where the second handwritten input is accepted, and the first area and the second area do not overlap each other.

* * * * *